United States Patent [19]

Dirks et al.

[11] 4,090,998

[45] May 23, 1978

[54] CROSS-LINKED WATER-SWELLABLE INDENE-MALEIC ANHYDRIDE INTERPOLYMERS

[75] Inventors: Gary W. Dirks, Bedford Heights; George S. Li, Aurora; John F. Jones, Cuyahoga Falls, all of Ohio

[73] Assignee: The Standard Oil Company, Cleveland, Ohio

[21] Appl. No.: 745,203

[22] Filed: Nov. 26, 1976

[51] Int. Cl.² .................................. C08F 222/06
[52] U.S. Cl. ...................... 260/63 R; 260/29.6 TA; 260/63 UY; 260/79.3 MU; 526/240; 526/272
[58] Field of Search ............................ 526/272, 240; 260/63 UY, 63 R, 79.3 MU

[56] References Cited

U.S. PATENT DOCUMENTS

| | | | |
|---|---|---|---|
| 2,297,351 | 9/1942 | Gerhart | 204/158 |
| 2,647,886 | 8/1953 | Seymour | 260/78.5 |

*Primary Examiner*—Stanford M. Levin
*Attorney, Agent, or Firm*—John F. Jones; Larry W. Evans

[57] ABSTRACT

Polymers which are water swellable in the form of their salts are prepared by polymerization of a monomeric mixture of maleic anhydride, indene and a cross-linking monomer containing a plurality of $CH_2=C<$ groupings.

5 Claims, No Drawings

CROSS-LINKED WATER-SWELLABLE INDENE-MALEIC ANHYDRIDE INTERPOLYMERS

This invention relates to water-swellable polymers of an indene-maleic anhydride-cross-linking monomer and to a method for preparation of same.

We have discovered that water thickeners of excellent efficiency can be prepared by polymerization of monomeric mixtures of maleic anhydride, indene and a cross-linking agent containing a plurality, i.e. more than one, of polymerizable $CH_2=C<$ groupings. Such polymeric compounds are useful as water thickeners and suspending agents which have utility in cosmetics, pharmaceuticals, cleaning and polishing compounds, latex coating applications, textile printing, well drilling and water purification.

In addition to the maleic anhydride and indene, a third essential monomer for use in the preparation of the compositions of this invention may be any polymerizable material which contains a plurality of polymerizable $CH_2=C<$ groupings and which is reactive with maleic anhydride and indene in their copolymerization. Polyunsaturated hydrocarbons, esters, amides, nitriles, acids, sulfones, polyunsaturated acid anhydrides, polyunsaturated ethers such as divinyl ether, diallyl ether, diallyl ethylene glycol ether, 1,4,5,8-naphthalene tetrol ethers, the vinyl, allyl, methallyl and crotyl polyethers containing 2 to 7 or more alkenyl ether groups per molecule, polyunsaturated ketones such as divinyl ketone, diallyl ketone, allyl-beta-allyloxy propionate, allyl methacrylyl sucrose, monoallyl maleate, and partial allyl ethers of polyhydric alcohols such as diallyl glycerol ether.

A preferred group of polyolefinic monomers in the present invention includes divinyl benzene, trivinyl benzene, divinyl naphthalene, triallyl cyanurate, methylene-bis-acrylamide, methylene-bis-methacrylamide, triacrylyl triazine, trimethacrylyl triazine, hexaallyl trimethylene trisulfone, tetraallyl methane, tetrabutenyl methane, tetraallyl silane, tetravinyl silane, tetraallyl germane, tetravinyl germane, ethylene glycol diacrylate, pentaerythritol tetraacrylate, allyl acrylate, allyl cinnamate, diallyl maleate, diallyl phthalate, divinyl ether, diallyl ether, 3,9-divinyl-2,4,8,10-tetraoxospiro[5,5]undecane, divinyl ketone, polyalkenyl polyethers of polyhydric alcohols such as polyallyl sucrose, tetraallyl pentaerythritol, and the like.

The amount of cross-linking agent can vary from 0.01% to about 10% by weight of the other monomers.

Because maleic anhydride and indene evidence a strong tendency to form alternating copolymers, it is not practical to use monomeric proportions which vary far from a 1:1 molar ratio of these materials. In the polymerization process of this invention, it is greatly preferred to use monomeric mixtures in which the maleic anhydride and indene are present in substantially equimolar proportions and in which the cross-linking agent can be varied in order to obtain the properties desired in the terpolymer. If proportions of maleic anhydride and indene other than equimolar are used, the yield of polymer is greatly reduced, and the polymer obtained will usually contain a relatively greater proportion of cross-linking agent than is represented in the original monomeric charge.

The polymers of this invention are prepared by polymerization of maleic anhydride, indene and the cross-linking agent in an inert diluent having some solubilizing action on one or more of the monomeric ingredients but substantially none on the resultant polymer. Polymerization in mass may be employed but is not preferred because of the incomplete conversions and the difficulty encountered in the work-up of the solid masses obtained. Polymerization in an organic liquid which is a solvent for the monomers but a non-solvent for the polymer, or a mixture of such solvents, in the presence of a solvent-soluble catalyst is most preferred because the product is usually obtained as a very fine friable and often fluffy precipitate which, after solvent removal, seldom requires grinding or other further treatment before use. Suitable solvents for the process of this invention include benzene, xylene, tetralin, hexane, heptane, carbon tetrachloride, methyl chloride, ethyl chloride, bromo trichloro methane, and others, and mixtures thereof.

Polymerization in the organic diluent medium may be carried out in the presence of a free-radical initiator in a closed vessel in an inert atmosphere and under autogenous pressure or in an open vessel under reflux at atmospheric pressure. The temperature of polymerization may be varied from 0° C or lower to 100° C or higher depending to a large degree on the molecular weight desired in the polymer.

The following examples are given to further illustrate the products and process of this invention and are not meant to limit the scope of this invention. The amounts of ingredients, unless otherwise indicated, are given in parts by weight.

EXAMPLE 1

A. A terpolymer of indene, maleic anhydride and divinyl benzene was prepared from the following ingredients:

| Ingredient | Parts |
| --- | --- |
| benzene | 300 |
| indene | 54 |
| maleic anhydride | 46 |
| divinyl benzene (active) | 0.50 |
| α,α'-azobisisobutyronitrile catalyst | 0.3 |

The ingredients were combined in a reactor which was then purged with nitrogen and sealed. The polymerization reaction was carried out at 60° C with agitation of the reaction mixture for 4 hours. The solid white polymer which resulted was isolated by filtration. The polymer was dried. A 1% by weight solution of the polymer in dilute aqueous ammonia gave a Brookfield viscosity (model LVT Spindle 4, 6 rpm) of 30,500 centipoises. B. A repeat of A above in which no divinyl benzene was employed gave a polymer which had the following Brookfield viscosity: 10 centipoises.

C. A series of polymers in which the amount of divinyl benzene was varied was prepared in accordance with A above and the following aqueous Brookfield viscosities at 0.6 rpm were obtained:

| Divinyl Benzene Charged (Parts) | Viscosity (Centipoises) |
| --- | --- |
| 0.25 | 6,500 |
| 0.50 | 112,000 |
| 0.75 | 23,000 |

EXAMPLE 2

The procedure of Example 1C was repeated using N,N'-methylene-bis-acrylamide in place of divinyl benzene. The resulting polymers at 1% in aqueous ammonia were found to have the following Brookfield viscosities at 0.6 rpm:

| N,N'-Methylene-Bis-Acrylamide (Parts) | Viscosity (Centipoises) |
| --- | --- |
| 1.0 | 1,150 |
| 1.5 | 124,000 |
| 4.0 | 51,000 |

EXAMPLE 3

The procedure of Example 1A was repeated except that 8 parts of triallyl cyanurate were used in place of the divinyl benzene. The Brookfield viscosity of a 1% solution of the resulting polymer in dilute aqueous ammonia was found to be 5,000 centipoises at 0.6 rpm.

EXAMPLE 4

The procedure of Example 3 was repeated using 3,9-divinyl-2,4,8,10-tetraoxospiro[5,5]undecane in place of triallyl cyanurate. The Brookfield viscosity of the resulting polymer at 1% in dilute aqueous ammonia was found to be 170 centipoises at 0.6 rpm.

We claim:

1. The cross-linked, water-swellable solid polymer composition which results from the polymerization in an inert organic diluent in the presence of a free-radical initiator at a temperature in the range of 0° to 100° C of a mixture of substantially equimolar amounts of maleic anhydride and indene and from 0.01 to 10% by weight based on the combined weight of maleic anhydride and indene of a cross-linking monomer having a plurality of polymerizable $CH_2=C<$ groupings.

2. The composition of claim 1 wherein the cross-linking monomer is divinyl benzene.

3. The composition of claim 1 wherein the cross-linking monomer is methylene-bis-acrylamide.

4. The composition of claim 1 wherein the cross-linking monomer is triallyl cyanurate.

5. The composition of claim 1 wherein the cross-linking monomer is 3,9-divinyl-2,4,8,10-tetraoxospiro[5,5-undecane.

* * * * *